Aug. 19, 1952          J. L. DRAKE          2,607,168
APPARATUS FOR PRODUCING SHEET GLASS
Filed Aug. 20, 1945          2 SHEETS—SHEET 1
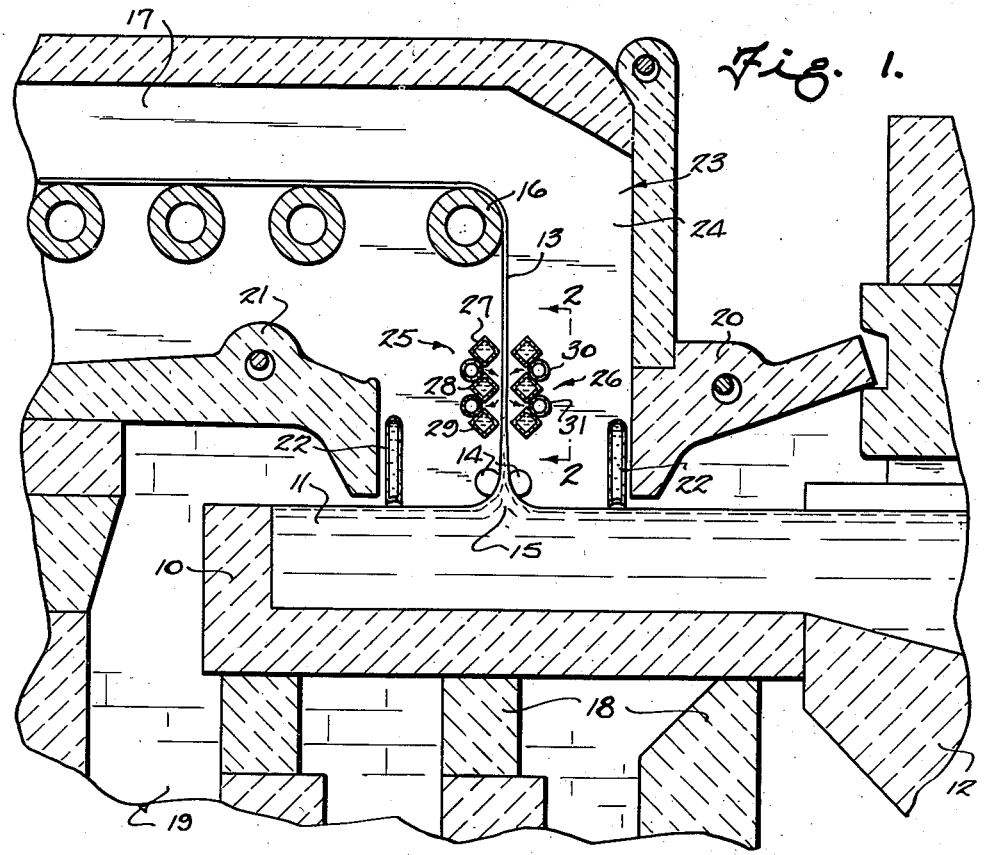
Inventor
JOHN L. DRAKE,
By Frank Fraser
Attorney Aug. 19, 1952 J. L. DRAKE 2,607,168
APPARATUS FOR PRODUCING SHEET GLASS
Filed Aug. 20, 1945 2 SHEETS—SHEET 2

Inventor
JOHN L. DRAKE.
By
Frank Fraser
Attorney

Patented Aug. 19, 1952

2,607,168

UNITED STATES PATENT OFFICE 2,607,168

APPARATUS FOR PRODUCING SHEET GLASS

John L. Drake, Toledo, Ohio, assignor to Libbey-Owens-Ford Glass Company, Toledo, Ohio, a corporation of Ohio Application August 20, 1945, Serial No. 611,508

5 Claims. (Cl. 49—17)

The present invention relates to the manufacture of flat glass. More particularly it has to do with the treatment of a glass sheet or ribbon as it is drawn from a molten bath, and with the conditioning of the atmosphere surrounding the newly formed sheet.

In all of the well known types of sheet glass drawing machines, of which there are a number in commercial use today, the sheet is drawn vertically from a bath of molten glass, and considerable difficulty has been experienced in attempting to obtain uniform temperatures transversely of the sheet. This lack of uniformity is largely due to uncontrolled air movements that are naturally set up in these machines, and it is primarily responsible for the waves, distortion and similar characteristic defects of flat drawn sheet glass.

To explain, the temperature of the atmosphere above the mass of molten glass from which the sheet is drawn, in any of the conventional machines, is of course high; but it is not naturally uniform, either across the sheet itself or across its base or line of formation. Instead there is always a stack effect in the machine that carries the hot air up along the center line of the rising sheet, and that also acts to draw relatively cool air inwardly from beyond the sheet edges.

The cooler air moving toward the center in turn rises continually as it heats up and expands and thus sets up cross currents that vary progressively from cool to hot as they flow inwardly past the sheet edges and finally join the stream of hot air along the path of travel of the sheet. These continuous cross currents of air of different temperatures, in combination with the convection currents that are naturally set up along the surface of the hot sheet, create an uncontrolled turbulence in the atmosphere of the machine's drawing chamber that is an ever present obstacle to the establishment of those uniform temperature conditions that are a prime requisite to the production of glass sheets of high quality and uniform thickness.

In drawing a ribbon or sheet of glass from the surface of a molten mass, there is created what is known as a meniscus or thickened portion at the base of the sheet, and this meniscus pulls progressively thinner and thinner as the ribbon moves upward until the glass becomes substantially set in the final sheet thickness. The thickness finally attained depends chiefly upon the viscosity of the glass and the speed at which the sheet is drawn from the bath; and, since the viscosity of the glass is dependent on its temperature, temperatures that are not constant, or that are uneven or not uniform, will seriously affect the quality of the finished product.

To illustrate, in areas where relatively cold air strikes the unset glass, it will chill and set up more rapidly and so will be above the average thickness at this point or along this line in the finished sheet. On the other hand, areas that are subjected to excessive heat will continue to attenuate and grow thinner considerably beyond the normal setting up point; and where such conditions alternate with one another across the sheet they produce permanent streaks, waves and distortion.

Attempts have been made to cut down on the variations in temperature and the uncontrolled air movements in the drawing chambers by enclosing these chambers as completely as possible from the outside air. This has proved to be good practice and does reduce the unsatisfactory conditions. But its action is to cut down rather than to completely correct the difficulty.

There is always a considerable infiltration of air through such enclosures and the relatively cold infiltering air is drawn in across the sheet in the manner described above. In addition this air brings in dust and other particles which may embed themselves in the soft glass, or may lodge upon the rolls with which the sheet comes in contact, to cause serious surface defects.

It is the primary aim of this invention to produce sheet glass of exceptionally fine quality and substantially free from waves and distortion on regular drawing machines of the character just described.

Another object is the provision of a novel apparatus for achieving the above results and which makes it possible to draw such glass in any given thickness at a higher rate of speed.

Another object is to counteract and so overcome the natural lack of uniformity of temperature and air movements across the sheet being formed in these machines, by setting up a positive and controlled cooling action and flow of air at the critical point in the formation of the sheet.

Another object is to provide the controlled air flow referred to above by a recirculation of the air already in the machine and without introducing supplemental air from outside.

Another object is the provision of a uniform and relatively quick acting conditioning or temperature control means which makes use of both radiant and controlled convection cooling.

Still another object is to effect a uniform temperature control across the width of the sheet being formed by subjecting the sheet to accelerated cooling action along spaced, transverse lines, and to reduced cooling action along the wider areas therebetween.

Other objects and advantages of the invention will become more apparent during the course of the following description, when taken in connection with the accompanying drawings.

In the drawings, wherein like numerals are employed to designate like parts throughout the same:

Fig. 1 is a longitudinal, vertical sectional view through a sheet glass drawing machine of the Colburn type, showing a preferred embodiment of the apparatus of my invention in position;

Fig. 2 is a view taken substantially along the line 2—2 in Fig. 1;

Fig. 3 is a fragmentary perspective view of the conditioning or temperature control device of Figs. 1 and 2;

Figure 4:
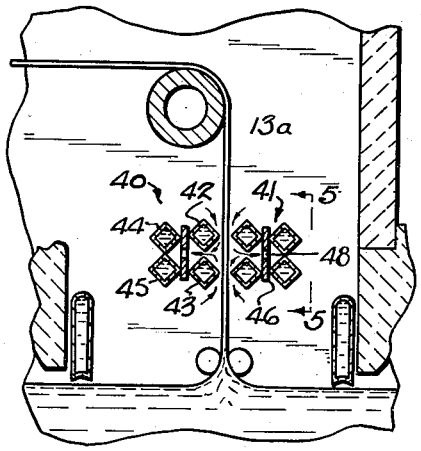
Fig. 4 is a fragmentary view similar to Fig. 1 illustrating a modified form of the invention.

This invention can be employed in conjunction with any of the well known or conventional sheet glass drawing machines, in all of which a ribbon or sheet of glass is continuously drawn from a bath of molten glass in a receptacle that is supplied from a tank furnace. The Colburn type of machine, in connection with which the invention has been illustrated in the drawings, is representative and exhibits and characteristic problems with regard to the atmospheric conditions in the zone of sheet formation.

Thus the Colburn machine itself, which is best shown in Fig. 1, includes a receptacle or draw pot 10, at the end of a continuous tank furnace from which it receives a constant supply of properly conditioned molten glass 11, through a cooling chamber 12. A ribbon of glass 13 is drawn vertically from the molten bath 11, being held to width by pairs of knurled rollers 14, rotating within the opposite edges of the meniscus 15. The ribbon 13 is then bent into the horizontal plane over a bending roll 16 before being passed through a flattening chamber 17 and an annealing leer (not shown), after which it is cut up into individual sheets. The draw pot 10 is mounted on stools 18 in a pot chamber 19 heated by suitable burners (not shown), and lip-tiles 20 and 21 together with lip-tile coolers 22 are provided to protect the rising sheet from blasts of heated air from the furnace and draw pot. The coolers 22 also act to cool the surface of the glass in the molten bath just before it passes into the sheet.

The structure so far described is standard construction for Colburn type machines, which are characterized principally by the fact that the glass ribbon is bent 90° before entering the flattening and annealing zones. In other kinds of sheet glass drawing machines, the sheet is carried through vertically disposed leers, and in still another form the sheet or ribbon is carried upwardly a substantially greater distance than shown here, then cut and transferred as individual sheets to a horizontally disposed leer.

The area of the drawing chamber 23 lying above the surface of the molten glass 11 and between the lip-tile coolers 22 is referred to herein as the zone of sheet formation. Within this zone is the exposed surface of the glass in the draw pot, the meniscus 15 and the sheet 13 itself. The bending roll 16 is spaced a sufficient distance above the molten bath so that the surface of the sheet when it reaches the roll will be set to a point where it will not be marred by the contact, provided of course, that the contacting surfaces are kept clean.

As shown, the drawing chamber 23 is closed to the outside air by closure means 24 at either end of the chamber, which are adapted to enclose or fit tightly around any mounting means, conduits and the like that extend outwardly beyond the ends of the machine proper. Although my invention will give results even without a machine enclosure I prefer to use one because, as pointed out above, it does cut down appreciably on the flow of cold air into the machine, and facilitates the carrying out of my special conditioning technique.

The conditioning device which I employ in Fig. 1 makes it possible to exert a positive and uniform cooling action upon the glass sheet, and at the same time to set up a controlled flow of air over the sheet surface, while it is in its formative stage.

Briefly, the apparatus comprises novel combination air and water coolers or heat exchangers 25 and 26, mounted in horizontal alignment with one another at opposite sides of the sheet and a short distance above the molten glass 11. Under normal conditions I position the coolers 25 and 26 about as shown in the drawing, which is midway between the molten glass 11 and the bending roll 16, and also near enough to the sheet to interrupt the flow of natural convection currents that may be set up in contact therewith. However, it may be advantageous to shift the position of either one or both of them in one direction or another depending on the temperatures used, thickness of sheet being drawn or particular conditions encountered. For this reason it is desirable to provide the coolers with some sort of universally adjustable mounting (not shown).

In the embodiment of the invention set forth in Figs. 1 to 3 each of the coolers 25 and 26 includes three tubes, 27, 28 and 29, diamond shaped in cross section, and arranged in vertical alignment, corner to corner, but slightly spaced from one another. By the term "diamond shaped" I intend to include a square figure arranged to rest on one of its corners as well as the true diamond shape whose equal sides form two acute and two obtuse angles. The three diamond shaped tubes of each complete cooler are secured in assembled relationship by means of two cylindrical pipes 30 and 31 welded to the angled faces of each two adjacent tubes of the three. This entire unit as just described is simple and economical to make. The members 30 and 31 can be ordinary cylindrical piping, and the tubes 27, 28 and 29 may be sections of regular square, sheet metal tubing which is readily available commercially in stock sizes.

The tubes 27, 28 and 29 are adapted to have a suitable cooling medium, such as water, circulated continuously therethrough, and the interiors of the several tubes are suitably connected to one another so that the medium is introduced through an inlet pipe 32, flows through tube 27 to the end, then into tube 28 and then through to its opposite end, then into and through tube 29, after which it discharges through outlet pipe 33 (Fig. 2). Of course the heat exchangers 25 and 26 could be made of a single rectangular casing having a serrated face, but I consider the tube construction to be more rigid and more economical.

Air or gas is fed into pipe 30 under pressure to exhaust through spaced openings 34 arranged along its length, and at the same time air or gas is drawn into the pipe 31 through similar openings 35 and finally exhausted. This can be accomplished in a number of different ways but, as shown in Fig. 2, one satisfactory way is to mount a blower 36 within the machine enclosure and to connect the pipe 30 to the outlet and pipe 31 to the intake side of the blower.

Air forced out through the openings 34 in pipes 30 will pass through the space between the corners of adjacent tubes 27 to 29 and be blown across the face of the sheet 13 at this point. Simultaneously air will be drawn in through the openings 35 in the pipes 31 so that a continuous flow of air will be set up as shown by the arrows in Fig. 1.

It will be noted that with this arrangement no outside air is used in setting up the controlled air flow. Instead a continuous circulation of the air already in the zone of sheet formation is effected. This has the advantage that a more uniform temperature across the sheet will result, with little or no preconditioning of the air being circulated. Moreover, the use of the air already within the chamber avoids the introduction of dirt and other foreign matter from outside.

The tubes 27, 28 and 29 serve a twofold purpose. In the first place they exert a positive and accelerated line cooling action on the glass sheet opposite the corners 37, combined with a lesser cooling action between these lines. This produces a more uniform cooling action across the sheet than is obtained with any kind of flat cooler. The reason for this lies in the fact that sheet metal of sufficient thinness to make satisfactory coolers is usually wavy and of not particular uniform thickness. Consequently, when a fairly wide surface is presented directly to the sheet to be cooled, the cooling action will vary in accordance with the unevenness and lack of uniformity of the sheet metal surface of the cooler.

This is not true of the line cooling because the corners 37 of the coolers can be readily made equidistant from the sheet and substantially equal in their cooling action throughout their length. Moreover, the cooling action exerted by the flat portions 38 and 39 of the tubes, and which for the reasons given above is less uniform than the line cooling exerted opposite the corners 37 of said tubes, is also of less intensity here because these portions slant sharply away from the sheet. For the same reason their cooling action will be less direct as contrasted with the line cooling provided opposite the corners 37 and will tend to equalize before it is felt on the sheet.

The second function of the tubes 27 to 29 is to condition the air flowing through the pipes 30 and 31 as to temperature. The flow of this tempered air as it passes from the openings in one pipe to those in the other tends to further accelerate and distribute the action of the line cooling on the sheet, and at the same time to further equalize the cooling action between the lines. This action is assisted by the fact that the flow of tempered air is relatively slow in the spaces between the glass and the angled sides of the tubes, but increases sharply in velocity as it flows through the narrow spaces between the glass sheet and the corners 37 of the tubes.

From this it will also be noted that the cooling action of the heat exchangers 25 and 26 is the result of two different types of cooling; namely, the absorption of radiant heat by the tubes 27, 28 and 29, combined with controlled convection cooling by the air flowing between the pipes 30 and 31.

The modified form of conditioning apparatus shown in Fig. 4 is similar in operation and advantages to the one just described. Thus, it too consists of a pair of heat exchangers 40 and 41 mounted one on either side of the rising sheet 13a. Also, each of these heat exchangers includes a plurality of tubes that are diamond shaped in cross section. Specifically, in this case a pair of vertically aligned tubes 42 and 43 arranged in slightly spaced relation to each other are welded by their corners to one face of a metal plate 46, while a second pair of tubes 44 and 45, similarly arranged, are welded to the opposite face of the plate 46 and in addition have their adjacent corners welded together.

Figure 6:
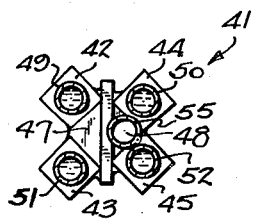
Fig. 6 is an end view of the cooling or conditioning device shown in Figs. 4 and 5.

The spaces 47 and 48 between the two pairs of tubes and the plate 46 are closed at both ends as shown in Fig. 6. In this way the space 48 forms an air conduit that is similar in purpose to the pipes 30 and 31 in the structure of Figs. 1 to 3.

All of the tubes 42 to 45 are adapted to have water or other cooling medium circulated therethrough by means of the inlet pipes 49 and 50, and outlet pipes 51 and 52 as shown; and the cooling action of tubes 42 and 43 on the sheet 13a is practically identical with that of the three diamond shaped tubes in Figs. 1 to 3. The tubes 44 and 45 on the other hand serve to keep the air in the space 48 at the proper temperature and to strengthen the entire device.

Controlled circulation of air along the paths indicated by the arrows in Fig. 4 is effected in this embodiment by withdrawing air through the space between the adjacent corners of the tubes 42 and 43, and thence through a series of spaced openings 53 extending the length of the plate 46. The actual exhausting of the air in this manner is accomplished by means of a blower 54 mounted within the enclosure and having its intake side connected to the space 48 by means of a pipe 55. The blower's outlet pipe 56 preferably exhausts within the machine enclosure so that the circulation of air can be effected without disturbing the balance of pressure in the enclosure and so inducing infiltration of outside air.

Figure 9:
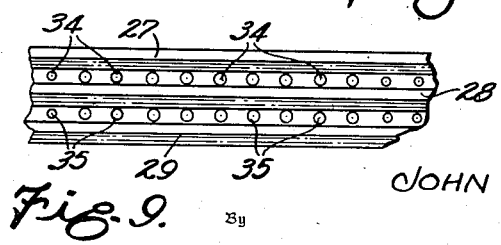
Fig. 9 is a modification of the cooler illustrated in Figs. 1 and 2 looking at the inner face of the cooler.

The openings 53 in the plate 46 are preferably of progressively increasing size from the edges of the plate toward its center. This further serves to equalize the cooling action exerted, by withdrawing a larger amount of air from the relatively hot middle of the glass and a smaller amount from the relatively cooler edges. A corresponding variation in the sizes of the holes 34 and 35 in the pipes 30 and 31 of Figs. 1 to 3 can be made to achieve the particular result desired there. Thus, as is shown in Fig. 9, the holes 34 in the pipe 30 and the holes 35 in the pipe 31 may progressively decrease in size from the central portions of said pipes outwardly toward the opposite ends thereof.

Figure 5:
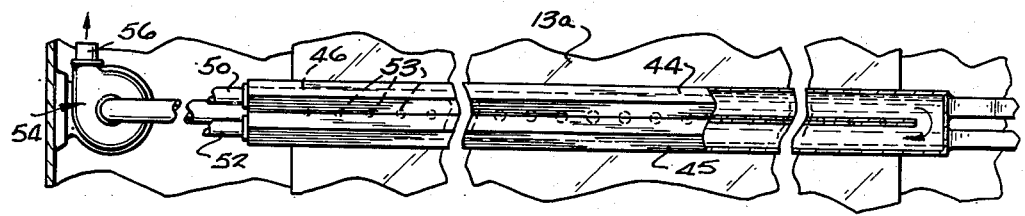
Fig. 5 is a view taken substantially on the line 5—5 of Fig. 4 with parts of the temperature control device broken away.
Figure 7:
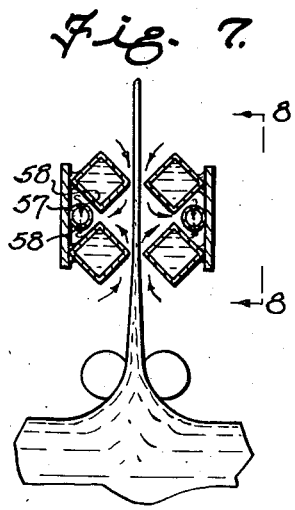
Fig. 7 is a fragmentary sectional view similar to Figs. 1 and 4 illustrating still another form of the invention.
Figure 8:
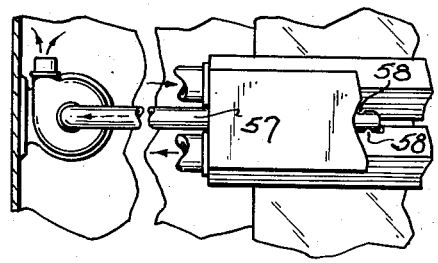
Fig. 8 is a fragmentary view looking in the direction of the arrows on line 8—8 in Fig. 7.

The modified apparatus shown in Figs. 7 and 8 is similar to that of Figs. 4 to 6 except that the tubes 44 and 45 on one side of the plate 46 are omitted and a pipe 57 provided with openings 58 performs the function of the enclosed space 48 and the holes 53 in Figs. 4 to 6. The principal advantage here is in simplicity of construction.

Under some circumstances it may be desirable to force air out, rather than to draw it in, past the surface of the glass sheet, and outside air may be used in setting up the circulation of air rather than only recirculating the air already in the machine. In fact when the circulation is effected by pressure rather than suction, the use of preconditioned air from the outside may be an advantage in that it will build up a pressure within the enclosure that will positively prevent infiltration of any uncontrolled air currents from the outside.

Curved bottoms have been indicated in the liptile coolers 22 in order to give a spaced line cooling of the surface of glass in the molten bath just it enters the sheet, and to thus supplement the similar cooling action to which the sheet is to be subsequently subjected.

The use of my invention in any of its forms with proper control of the air and water temperatures and pressures will not only condition and cool the glass sheet more uniformly than has heretofore been considered possible, but it will also cool it faster and with no injurious effects. As a consequence sheets of better quality can be drawn from the bath of molten glass, and at a higher rate of speed. This permits greater production from existing machines, and a further increase can be effected by the use of wider machines made possible by this remarkably uniform conditioning of the sheet.

In each of the three examples of the invention shown, larger or smaller numbers of the diamond shaped tubes may be used with proper modification of their associated conduits and connections, and in some cases a single cooler on one side of the sheet instead of one on each side may be sufficient. It is also to be understood that various other changes in the shape, size and arrangement of parts may be resorted to without departing from the spirit of the invention or the scope of the subjoined claims.

I claim:

1. In a glass forming machine, a heat exchanger comprising, a plurality of tubular members diamond shaped in cross section arranged one above the other with the corners of adjacent tubes being in close relation to one another and having an opening between said corners, and means at one side of said tubes and in engagement with adjacent tubes for bridging the gap therebetween and presenting openings which provide an air passageway communicating with the openings between said corners of said tubular members.

2. In a glass forming machine, a heat exchanger comprising, a series of tubular members diamond shaped in cross section and arranged in substantial alignment with one another with the corners of adjacent members in close relation but having an opening therebetween, means arranged at one side of said tubular members and associated therewith to provide independent passageways communicating with the openings between each pair of adjacent tubular members, means for supplying a cooling medium under pressure to one of said passageways and means for withdrawing cooling medium from another of said passageways.

3. In a glass forming machine, a heat exchanger comprising, a plurality of tubular members diamond shaped in cross section arranged with the corners of adjacent members in close relationship and with an opening therebetween, a plate at one side of said members and secured to the corners thereof to bridge the gap therebetween and provide a passageway therealong, a second set of tubular members secured at their corners to said plate substantially opposite to said first-mentioned tubular members to form a passageway behind said plate communicating with the bridged gap and the passageway between the first-mentioned tubular members by way of an opening through said plate, and means for passing air at a pressure other than atmospheric through the passageway behind said plate.

4. In a glass forming machine, a heat exchanger comprising, a plurality of tubular members diamond shaped in cross section arranged with their adjacent corners in close relation but with an opening therebetween, a plate positioned on one side of said members and secured to the corners thereof to bridge the gap therebetween and to form a passageway therealong, and means associated with said plate for setting up a controlled flow of air through the space between the close corners of said tubular members.

5. In apparatus for producing sheet glass including a working receptacle containing a mass of molten glass and means for drawing a ribbon or sheet of glass therefrom; a heat exchanger positioned at one side of said sheet comprising, a plurality of tubular diamond shaped members arranged with their adjacent corners in close relation but with a space therebetween extending substantially the length of said members, means for creating a flow of air through said space, and means for supporting said members in close spaced relation, said last-named means presenting openings for varying the volume of air flowing through said space at a plurality of points along its length.

JOHN L. DRAKE.

REFERENCES CITED

The following references are of record in the file of this patent:

UNITED STATES PATENTS

| Number | Name | Date |
|---|---|---|
| 1,015,404 | Schewczik | Jan. 23, 1912 |
| 1,550,428 | Corl | Aug. 18, 1925 |
| 2,042,610 | Littleton | June 2, 1936 |
| 2,125,914 | Haight | Aug. 9, 1938 |
| 2,158,669 | Amsler | May 16, 1939 |
| 2,201,286 | Bundy | May 21, 1940 |
| 2,246,053 | Magrini | June 17, 1941 |
| 2,254,227 | Lewis | Sept. 2, 1941 |
| 2,278,328 | Magrini | Mar. 31, 1942 |
| 2,352,539 | Halbach et al. | June 27, 1944 |

FOREIGN PATENTS

| Number | Country | Date |
|---|---|---|
| 541,049 | Great Britain | Nov. 11, 1941 |
| 658,208 | France | Jan. 22, 1929 |